(12) United States Patent
Graetz (10) Patent No.: US 11,242,112 B2
(45) Date of Patent: Feb. 8, 2022

(54) GRIP SYSTEM

(71) Applicant: MG Components GmbH & Co. KG, Wiggensbach (DE)

(72) Inventor: Michael Graetz, Wiggensbach (DE)

(73) Assignee: MG COMPONENTS GMBH & CO. KG, Wiggensbach (DE)

( * ) Notice: Subject to any disclaimer, the term of this patent is extended or adjusted under 35 U.S.C. 154(b) by 0 days.

(21) Appl. No.: 17/007,171

(22) Filed: Aug. 31, 2020

(65) Prior Publication Data

US 2021/0061403 A1 Mar. 4, 2021

(30) Foreign Application Priority Data

Aug. 30, 2019 (DE) .......................... 102019123306.2

(51) Int. Cl.
 *B62K 21/26* (2006.01)
(52) U.S. Cl.
 CPC ................................... *B62K 21/26* (2013.01)
(58) Field of Classification Search
 CPC ..................................................... B62K 21/26
 See application file for complete search history.

(56) References Cited

U.S. PATENT DOCUMENTS

| | | | | | |
|---|---|---|---|---|---|
| 1,580,724 | A | * | 4/1926 | Harmon | B62K 21/26 74/551.9 |
| 2,205,769 | A | * | 6/1940 | Sweetland | A63B 60/12 81/492 |
| 3,832,912 | A | * | 9/1974 | Edwards | B62M 25/04 74/551.8 |
| 6,964,214 | B2 | * | 11/2005 | Wu | B62K 21/26 16/422 |

FOREIGN PATENT DOCUMENTS

| | | |
|---|---|---|
| CN | 2727032 Y | 9/2005 |
| CN | 201211914 Y | 3/2009 |
| CN | 201961479 A | 9/2011 |
| CN | 102424087 Y | 4/2012 |
| DE | 150513 A | 5/1903 |
| DE | 10033327 A1 | 1/2002 |
| DE | 102012006168 A1 | 10/2013 |

* cited by examiner

*Primary Examiner* — Vicky A Johnson
(74) *Attorney, Agent, or Firm* — Browdy and Neimark, PLLC (57) ABSTRACT

A bicycle grip with a tubular inner sleeve and a grip element surrounding the inner sleeve, and a clamping ring element connected to the bicycle grip for clamping the bicycle grip onto a handlebar, wherein a bushing is inserted into the hollow space of the handlebar on its face and which bushing has an internal thread into which an adjustment mechanism connected to the bicycle grip can be screwed for axially adjusting the handlebar width.

11 Claims, 8 Drawing Sheets

GRIP SYSTEM

FIELD

The subject of the invention is a grip system for a bicycle handlebar.

BACKGROUND

The bicycle handlebar is connected to the fork via a stem. Said bicycle handlebar has a variety of tasks, such as, for example, steering the bicycle, supporting part of the rider's weight, counter-hold for additional use of trunk and arm muscles, damping shocks from the road and fastening controls and accessories such as brake levers, gear levers, bells, bike computers, etc.

The handlebar ends of the bicycle handlebar must be closed with handlebar grips or steering plugs that can withstand a pull-off force of 70 N even when wet.

The handlebar grips, hereinafter referred to as the grip system, at the ends of the handlebar ensure a secure grip and are injection-molded from plastic (polyvinyl chloride—PVC). Air chambers must remain between the palms of the hands and the grip so that there is a good grip and the hands do not sweat during longer journeys. This is achieved by ribs or lamellae running lengthways or across the handlebar tube.

Such grip systems are known, for example, from DE 10 2012 006 168 A1. This document discloses a simple bicycle grip which is pushed onto the handlebar end and fixed there. Such a fixation is achieved via a clamping ring element or a clamp. The disadvantage of this device, however, is that the grip can only be pushed on up to a certain handlebar width. If the handlebar width is to be changed, the grip must be loosened and removed so that the handlebar can be sawn off to the desired length.

The disadvantage here is that it is usually very difficult to shorten both handlebar ends to exactly the same length. In addition, an incorrectly executed sawing process can no longer be reversed and the handlebar becomes unusable.

Instead of shortening the handlebars by sawing, other devices are known from the prior art for changing the handlebar width. This can be achieved, for example, by pushing on individual spacers or plugs, which are pushed onto the handlebar tube at the handlebar end. Depending on the desired handlebar width, several plugs can be inserted into one another.

Instead of these plugs, it is also known to insert a single plug with a defined length into the end of a handlebar tube in order to widen the handlebar as a whole in length.

Following the insertion of such plugs into the end of the handlebar, the grip can be pushed back onto the handlebar and fixed there. However, this is very cumbersome, as the grip has to be pulled off each time to change the width of the handlebar. In addition, the handlebar with the plugs inserted into one another is no longer as resilient as it was without the plugs.

This is a safety risk as the handlebar is highly loaded while riding the bicycle. Depending on the sitting position, up to a third of the body weight rests on the handlebar during a normal bicycle ride, and when braking hard or in case of hard shocks from the road even the entire body weight, in extreme cases up to 1,500 N.

There is also the disadvantage that the plugs can loosen and cause noises inside the grip.

Due to the dimensions of these plugs, only certain lengths can be set, a steplessly variable widening of the handlebar is thus not possible.

SUMMARY

It is therefore the object of the invention to further develop a handlebar of the type mentioned at the outset in such a way that, taking into account a possible load on the handlebar grips, a simplified adjustment of the handlebar width is possible.

The object is achieved according to the invention by the features of the independent patent claim, while advantageous embodiments and developments of the invention can be found in the dependent claims.

An advantageous feature is that a non-rotatable bushing is installed into the hollow space of the handlebar at the end, which bushing has an internal thread into which an adjustment mechanism connected to the bicycle grip can be screwed for adjusting the handlebar width.

Thus, the present invention solves the above-mentioned problem in that a screw-like adjustment mechanism is fitted in a bushing in the area of the grip end and which can be screwed into the inside of the handlebar tube end by rotation and thus can also be moved in the direction of the handlebar center due to the connection with the bicycle grip. This creates a highly resilient and variable grip system.

The bicycle grip is thus set adjustable in length in the interior of the handlebar.

Another feature is that the adjustment mechanism is a screw with an external thread, the head of which is supported in a recess in the grip end of the grip element and has a tool engagement surface for turning the screw.

Such a tool engagement surface can have, for example, a hexagon socket, a hexalobular socket or some other profile shape, and transmit a torque applied by a tool in a form-fitting manner.

This recess has an inner cone for receiving a conical head in the grip end, with the screw being insertable into the grip element from the outside.

The bolt-shaped adjustment mechanism in the interior of the grip element has, between the thread and the head, an annular groove for receiving a circlip which, in the assembled state, clamps a washer on the inside of the grip end.

The screw-like adjustment mechanism is thus connected to the grip system and centered in the inner sleeve, which enables simplified assembly and easier insertion into the internal thread of the bushing.

In a further embodiment, the adjustment mechanism has a head with shaped bodies extending in the radial direction and is connected to the grip end of the grip element in a rotationally fixed manner. A tool can be dispensed with, here, since the grip system itself can be rotated and can therefore also be screwed to the internal thread of the bushing.

In a further manufacturing process, the adjustment mechanism could be connected to the grip in a form-fitting manner. For example, the adjustment mechanism, which is preferably formed from a metal, can be sprayed onto the grip.

This possibility of spraying onto the grip element can of course be realized with a screw made of high-strength plastic.

The advantage of this further embodiment is that the adjustment mechanism no longer has to be actuated with a tool, but can be actuated by simply rotating the grip about its longitudinal axis.

The bushing for the adjustment mechanism is glued or molded or screwed or pressed into the hollow space of the handlebar.

The bushing is preferably U-shaped and has a radially outwardly directed collar which rests on the end face of the handlebar.

In the area of the clamping ring element, a scale is attached to the handlebar, the position of the grip element being determinable via the position of the front edge of the clamping ring element on the scale.

In a further embodiment, the tubular inner sleeve is designed longer than the grip element and partially encases the handlebar. The clamping ring element is attached in the area where the inner sleeve is inserted into the grip element.

In a further embodiment, a shift lever unit and/or a brake lever unit and/or a bell with a clamping ring element connected to it can be pushed onto the area of the inner sleeve not encompassed by the grip element. Thus, the grip element can only be fixed on the handlebar by tightening the clamping ring element of these additional parts. There is therefore no need for a separate clamping ring on the grip system.

In order to reduce the diameter of the inner sleeve, it preferably has an axially extending clamping slot in the outer surface.

According to a first embodiment, it is provided that the handlebar consists in particular of a metal material and that the bushing for receiving the adjustment mechanism is injection-molded on the rear end of the handlebar during manufacture of the handlebar.

In a second embodiment it is provided that a detachable bushing is provided, which is only subsequently connected with the handlebar using a screw, rivet, adhesive or clamping connection.

In a third embodiment it is provided that a thread is cut into the handlebar end and thus a one-piece bushing is created.

Alternatively, the bushing can be pressed into the handlebar.

If the handlebar is made of a different material, such as carbon, the bushing can be created in one piece with the handlebar during the manufacture of the handlebar.

The inner diameter dimension of the inner sleeve is about 0.1-1 mm larger in size than the diameter of a handlebar.

The subject matter of the present invention results not only from the subject matter of the individual claims, but also from the combination of the individual patent claims with one another.

All information and features disclosed in the documents, including the abstract, in particular the spatial configuration shown in the drawings, are claimed to be essential to the invention insofar as they are novel, individually or in combination, compared to the prior art.

In the following, the innovation is explained in more detail with the aid of drawings showing several implementation methods. Further features and advantages of the innovation that are essential to the invention are apparent from the drawings and their description.

Insofar as individual subjects are designated as "essential to the invention" or "important", this does not mean that these subjects must necessarily form the subject of an independent claim. This is determined solely by the currently valid version of the independent claim.

DETAILED DESCRIPTION

Figure 1:
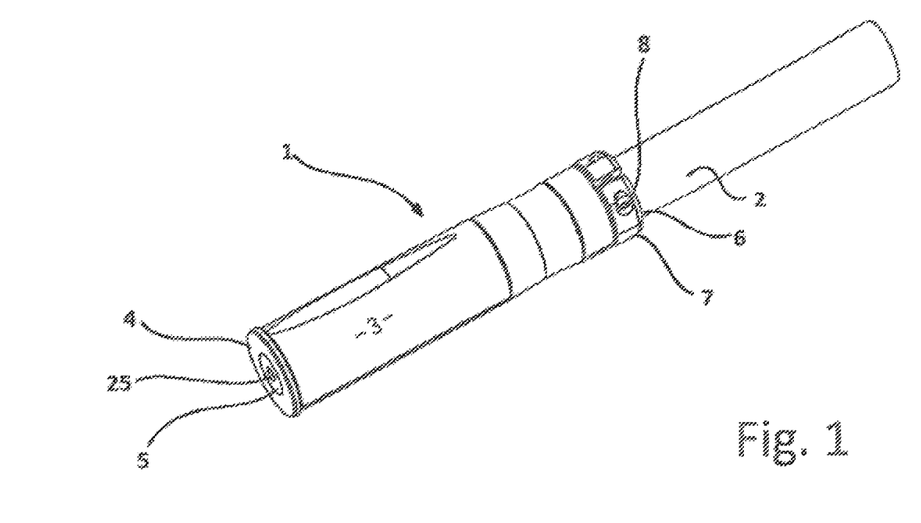
FIG. 1: shows perspective representation of the grip system on a handlebar

FIG. 1 shows a grip system 1 which is pushed onto a handlebar 2 and has the grip element 3. An adjustment mechanism 5 is fitted on the end face 4 of the grip system 1, which in the example shown here has a tool engagement surface 25 which is here a hexagon socket.

In the transition area between the grip system 1 and the handlebar 2, the grip system 1 has a clamping ring 7 which, together with the grip element, is pushed over the end of the handlebar tube. The clamping ring 7 has a clamping screw 8 with which the grip system can be fixed on the handlebar 2.

Figure 2:
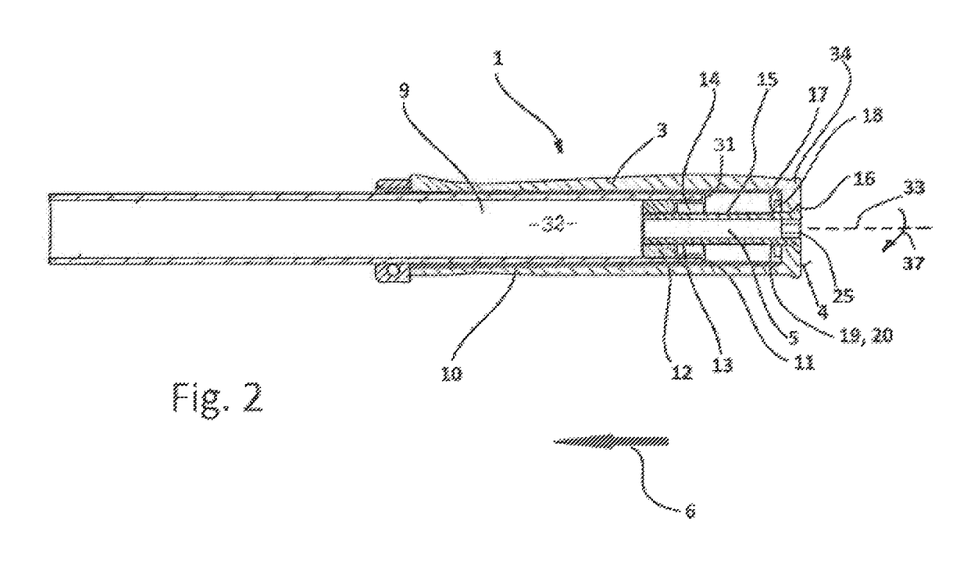
FIG. 2: shows a sectional representation of the grip system with adjustment mechanism

FIG. 2 shows a sectional representation of the grip system 1 which is pushed onto the handlebar 2. Here, the grip system 1 has an interior area 9 in which an inner sleeve 10 is arranged. Here, the inner sleeve 10 forms the base body, the rubber material of the grip element 3 being sprayed onto this base body. The inner sleeve 10 surrounds the handlebar 2 and is displaceable with respect to said handlebar, provided that the clamping ring 7 is released. At the end of the handlebar 2 or on its end face 11, said handlebar has a bushing 12 which is inserted into the hollow space 32 of the handlebar in the area of the end face 11.

The bushing 12 has an internal thread 13 and a recess 14 which is open in the direction of the end of the handlebar. The adjustment mechanism 5, which is a cylinder screw in the example shown here, is screwed into the internal thread 13. For this purpose, the adjustment mechanism 5 has the external thread 15, which is screwed into the internal thread 13. The adjustment mechanism 5 has the tool engagement surface 25, which in the example shown here is a hexagon socket.

The bushing 12 is U-shaped and has a radially outwardly directed collar 31 which rests on the end face 11 of the handlebar 2.

The adjustment mechanism 5 can be rotated about the axis of rotation 33 in the direction of arrow 37 by a tool (not shown), as a result of which the external thread 15 screws into the internal thread 13 of the bushing 12 and the grip system 1 moves in the direction of arrow 6.

Figure 3:
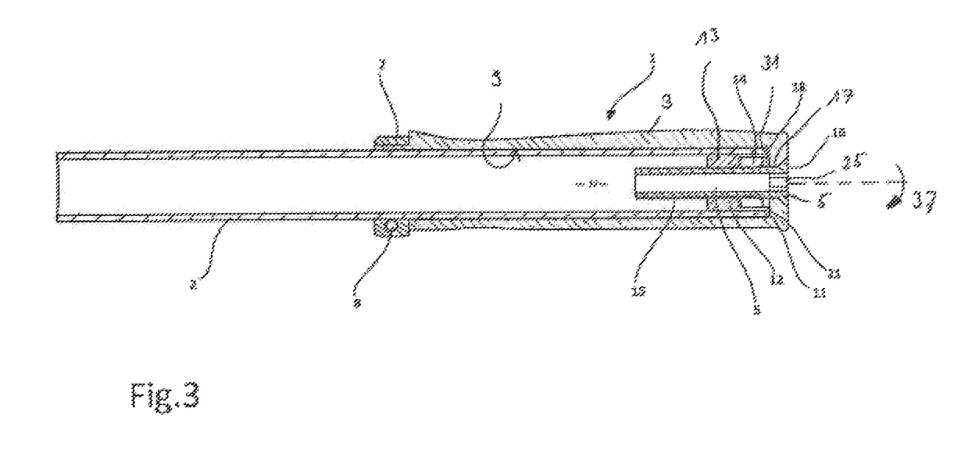
FIG. 3: shows a sectional representation of the grip system with adjustment mechanism

FIG. 3 shows how the adjustment mechanism 5 is completely screwed into the internal thread 13 and the grip system 1 with the inner surface 21 is located on the end face 11 of the handlebar 2. The inner surface 21 is part of the grip end 34. The remainder of the thread 15 protrudes from the rear of the bushing into the hollow space 32 of the handlebar 2. The washer 18 is received in the recess 17 so that the inner surface 21 comes to rest on the collar 31 of the bushing 12. This represents the position now set, which can be fixed by tightening the clamping screw 8 of the clamping ring 7.

Figure 4:
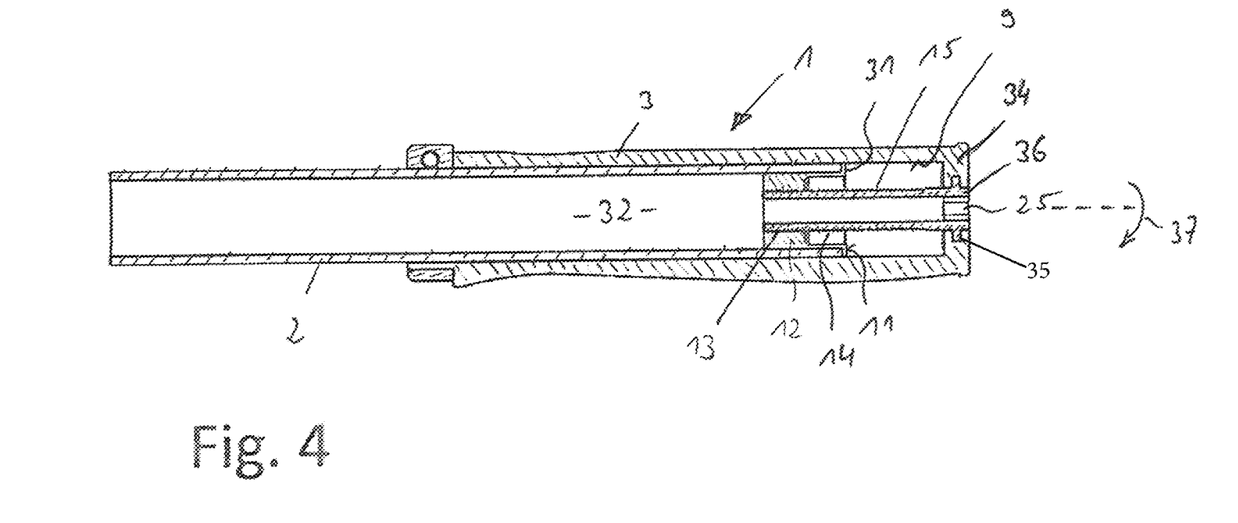
FIG. 4: shows a sectional representation of the grip system with adjustment mechanism (alternative embodiment)

FIG. 4 shows a further embodiment of the adjustment mechanism 5 according to the invention. Here, the screw head is not designed as a countersunk head but as a flat head 36 with shaped bodies 35 and is rotatably supported in the grip end 34. Upon actuation of the adjustment mechanism 5, the grip therefore does not rotate.

Figure 5:
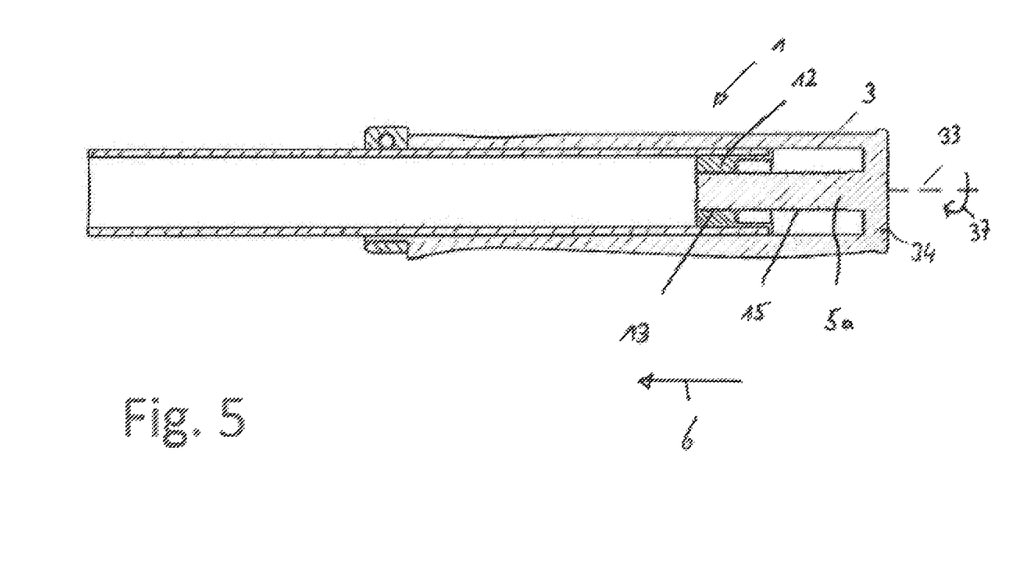
FIG. 5: shows a sectional representation of the grip system with adjustment mechanism (alternative embodiment)

FIG. 5 shows a further embodiment of the grip system 1 according to the invention, the adjustment mechanism 5a now being incorporated into the material of the grip system 1 during manufacture and connected to the grip system 1 in a form-fitting and integral manner. However, the invention is not limited thereto; other forms of connection between the adjustment mechanism and the grip are also possible.

The grip system 1 can be rotated about the axis of rotation 33 in the direction of arrow 37, as a result of which the external thread 15 screws into the internal thread 13 of the bushing 12 and the grip system moves in the direction of arrow 6.

The adjustment mechanism 5a can be sprayed into the grip element 3, for example.

In a further embodiment that differs from FIG. 5, the adjustment mechanism 5a is made of a different material than the grip element 3 and is encompassed by the grip element in a form-fitting manner. The material used can be, for example, plastic, aluminum, or something else. Due to the shape of the head of the adjustment mechanism, a rotary movement of the grip element 3 can be transferred to the adjustment mechanism, which is then screwed into the thread 13 of the bushing 12.

The two embodiments according to FIG. 5 have the advantage that a screw lock, as can be seen in FIG. 2 with the reference numerals 18, 19, 20, can be dispensed with.

Figure 6:
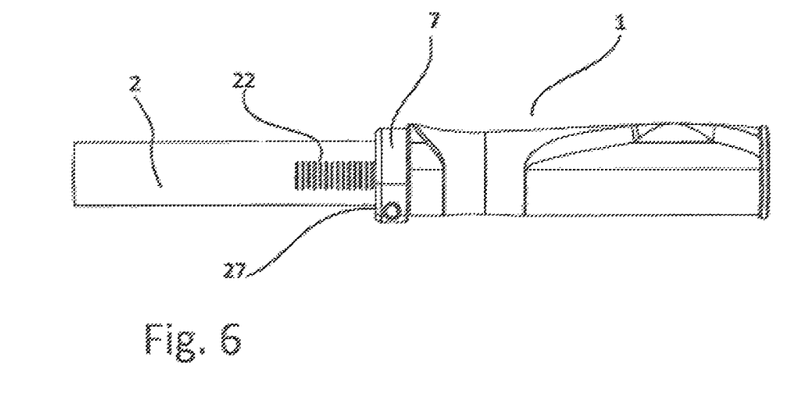
FIG. 6: shows a side view of the grip system with scale on the handlebar

FIG. 6 shows a further embodiment of the invention, a scale 22 being attached to the handlebar 2 in the area of the clamping ring 7. By displacing the grip system, the front edge 27 of the clamping ring 7 can be used to read on the scale 22 the position in which the grip system 1 is located. This makes it possible for the grip systems to be adjusted equally on both sides of the handlebar.

Figure 7:
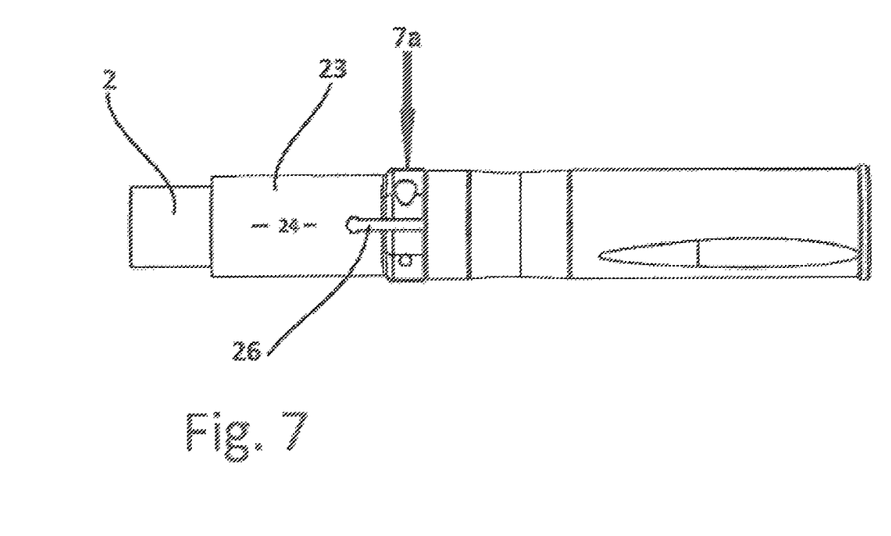
FIG. 7: shows a side view of the grip system with an extended inner sleeve

FIG. 7 shows a further embodiment, the sleeve 23 being molded onto the clamping ring 7a. The sleeve 23 has the surface 24 onto which, in a later assembly step, for example, a shift lever unit or a brake lever unit can be pushed and fixed. The sleeve 23 has the clamping slot 26 which narrows when the clamp 7a is tightened and the sleeve 23 is thus pressed onto the handlebar 2. Since the clamping ring 7a is molded onto the grip system 1, the grip system 1 is fixed also.

Among other things, this has the advantage that the elements mounted on the sleeve 23, such as, for example, a switching unit, a braking unit, etc., can be displaced in the same way as the grip system 1 when the clamp 7a is released.

Figure 8:
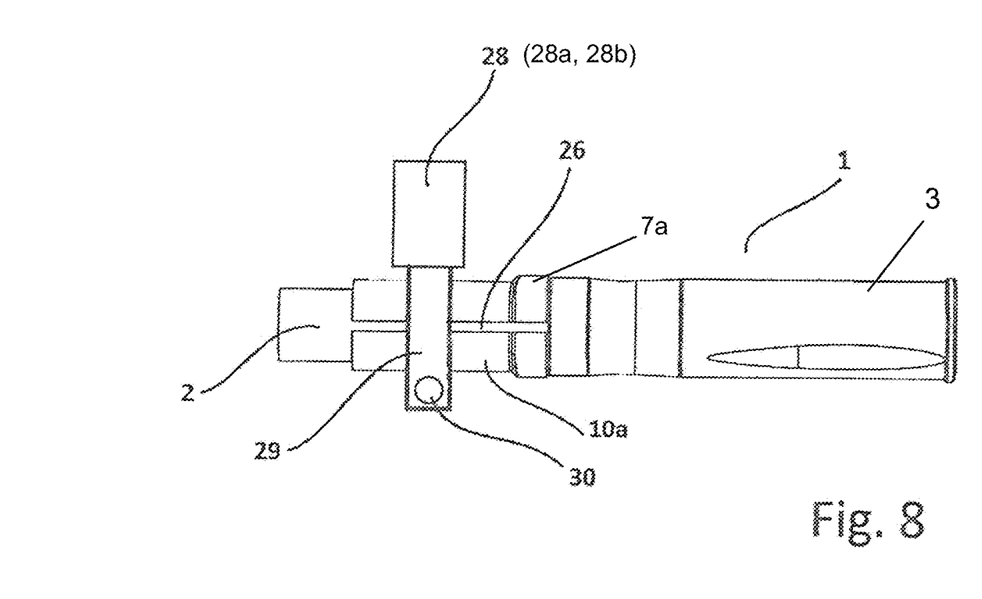
FIG. 8: shows a side view of the grip system with an extended inner sleeve (alternative embodiment)

FIG. 8 shows a further embodiment, the inner sleeve 10 shown in FIG. 2 now being made longer as an inner sleeve 10a and protruding from the grip system 1 in the direction of the center of the handlebar. In this embodiment, a clamping ring, which is connected to the grip system, is dispensed with. Rather, the clamping takes place here via, for example, a shift lever unit 28 (alternatively, a brake lever unit 28a and/or a bell 28b) which has its own clamping ring 7a. Said clamping ring surrounds the sleeve 10a. If the clamping ring 7a is now tightened via the clamping screw 30, the clamping slot 26a is also reduced at the same time, and when tightened further, the entire grip system is fixed in the set position on the handlebar 2.

LIST OF REFERENCE NUMERALS 1 grip system
2 handlebar
3 grip element
4 end face
5 adjustment mechanism 5a
7 clamp a
8 clamping screw
9 interior area
10 inner sleeve a
11 end face (of 2)
12 bushing
13 internal thread
14 recess
15 external thread
16 head
17 recess
18 washer
19 circlip
20 groove
21 inner surface
22 scale
23 sleeve
24 surface
25 tool engagement surface
26 clamping slot a
27 front (of 7)
28 shifting unit
29 clamp
30 clamping screw
31 collar (of 12)
32 hollow space (of 2)
33 axis of rotation
34 grip end
35 molded body
36 head (of 5a)
37 direction of the arrow

The invention claimed is:

1. A bicycle grip with a tubular inner sleeve and a grip element surrounding the inner sleeve, and a clamping ring element connected to the bicycle grip for clamping the bicycle grip onto a handlebar, wherein a non-rotatable bushing is installed into a hollow space of the handlebar at an end face, wherein the bushing has an internal thread into which an adjustment mechanism connected to the bicycle grip can be screwed for adjusting the handlebar width, wherein the bushing is U-shaped and has a radially outwardly directed collar which rests on the end face of the handlebar.

2. The bicycle grip according to claim 1, wherein the adjustment mechanism is a screw with an external thread, the head of which is supported in a recess in the grip end of the grip element and has a tool engagement surface for turning the screw.

3. The bicycle grip according to claim 1, comprising a recess for receiving a conical head in a grip end having an inner cone.

4. The bicycle grip according to claim 1, comprising a bolt-shaped adjustment mechanism having an annular groove for receiving a circlip in the interior of the grip element between the thread and the head, wherein the circlip, in the assembled state, clamps a washer on the inside of a grip end.

5. The bicycle grip according to claim 1, wherein the adjustment mechanism has a head with shaped bodies extending in the radial direction and is connected to the grip end of the grip element in a rotationally fixed manner.

6. The bicycle grip according to claim 1, wherein the bushing is glued or injected or screwed or pressed into the hollow space.

7. The bicycle grip according to claim 1, wherein a scale is attached to the handlebar in the area of the clamping ring element, and the position of the grip element being determinable via the position of front edge of the clamping ring element on the scale.

8. The bicycle grip according to claim 1, wherein the tubular inner sleeve is longer than the grip element and partially encases the handlebar and that the clamping ring element is attached in the area where the inner sleeve is inserted into the grip element.

9. The bicycle grip according to claim 1, wherein the tubular inner sleeve is longer than the grip element and partially encases the handlebar and in that a shift lever unit and/or a brake lever unit and/or a bell with a clamping ring element connected to it can be pushed onto the area of the inner sleeve not encompassed by the grip element.

10. A bicycle grip with a tubular inner sleeve and a grip element surrounding the inner sleeve, and a clamping ring element connected to the bicycle grip for clamping the bicycle grip onto a handlebar, wherein a non-rotatable bushing is installed into the hollow space of the handlebar at the end face, the bushing having an internal thread into which an adjustment mechanism connected to the bicycle grip can be screwed for adjusting the handlebar width, wherein the bolt-shaped adjustment mechanism has an annular groove for receiving a circlip in the interior of the grip element between the thread and the head, which circlip, in the assembled state, clamps a washer on the inside of the grip end.

11. A bicycle grip with a tubular inner sleeve and a grip element surrounding the inner sleeve, and a clamping ring element connected to the bicycle grip for clamping the bicycle grip onto a handlebar, wherein a non-rotatable bushing is installed into the hollow space of the handlebar at the end face, the bushing having an internal thread into which an adjustment mechanism connected to the bicycle grip can be screwed for adjusting the handlebar width, wherein the adjustment mechanism has a head with shaped bodies extending in the radial direction and is connected to the grip end of the grip element in a rotationally fixed manner.

* * * * *